United States Patent [19]
Cleave

[11] Patent Number: 5,793,813
[45] Date of Patent: Aug. 11, 1998

[54] COMMUNICATION SYSTEM EMPLOYING SPACE-BASED AND TERRESTRIAL TELECOMMUNICATIONS EQUIPMENT

[75] Inventor: Robert R. Cleave, Half Moon Bay, Calif.

[73] Assignee: Space Systems/Loral, Inc., Palo Alto, Calif.

[21] Appl. No.: 659,317

[22] Filed: Jun. 6, 1996

[51] Int. Cl.$^6$ ........................................ H04L 27/00
[52] U.S. Cl. ..................... 375/259; 375/377; 342/352
[58] Field of Search ........................ 375/259, 377, 375/222, 219; 342/352; 364/449.7; 455/12.1; 370/316, 401; 340/870.01, 853.3, 825.06

[56] References Cited

U.S. PATENT DOCUMENTS

| | | | |
|---|---|---|---|
| 5,491,473 | 2/1996 | Gilbert | 340/870.01 |
| 5,519,403 | 5/1996 | Bickley | 342/352 |
| 5,559,496 | 9/1996 | Dubats | 340/539 |
| 5,594,454 | 1/1997 | Devereux et al. | 342/357 |
| 5,634,190 | 5/1997 | Wiedeman | 455/13.1 |

*Primary Examiner*—Stephen Chin
*Assistant Examiner*—Betsy L. Deppe
*Attorney, Agent, or Firm*—Kenneth W. Float

[57] ABSTRACT

A communications system employing a telestation that uses a computer to provide command and data handling, a GPS receiver to provide position, time, and attitude information, and a transceiver to provide two-way wireless digital communications. The computer is coupled to an instrument, measuring device, or payload, and is controlled to relay data generated thereby to a user. Commands and data are uplinked and downlinked to the telestation by way of a satellite network, such as a Globalstar network. The telestation provides a user with real-time command and control of globally distributed instruments. This capability may be used terrestrially for gathering information (e.g., science, environmental, etc.) in remote or inhospitable locations, or where logistical support is inadequate. An in-orbit version may be used for spacecraft or satellite instruments 15, allowing investigators instant access to the instruments during all phases of a mission.

18 Claims, 4 Drawing Sheets

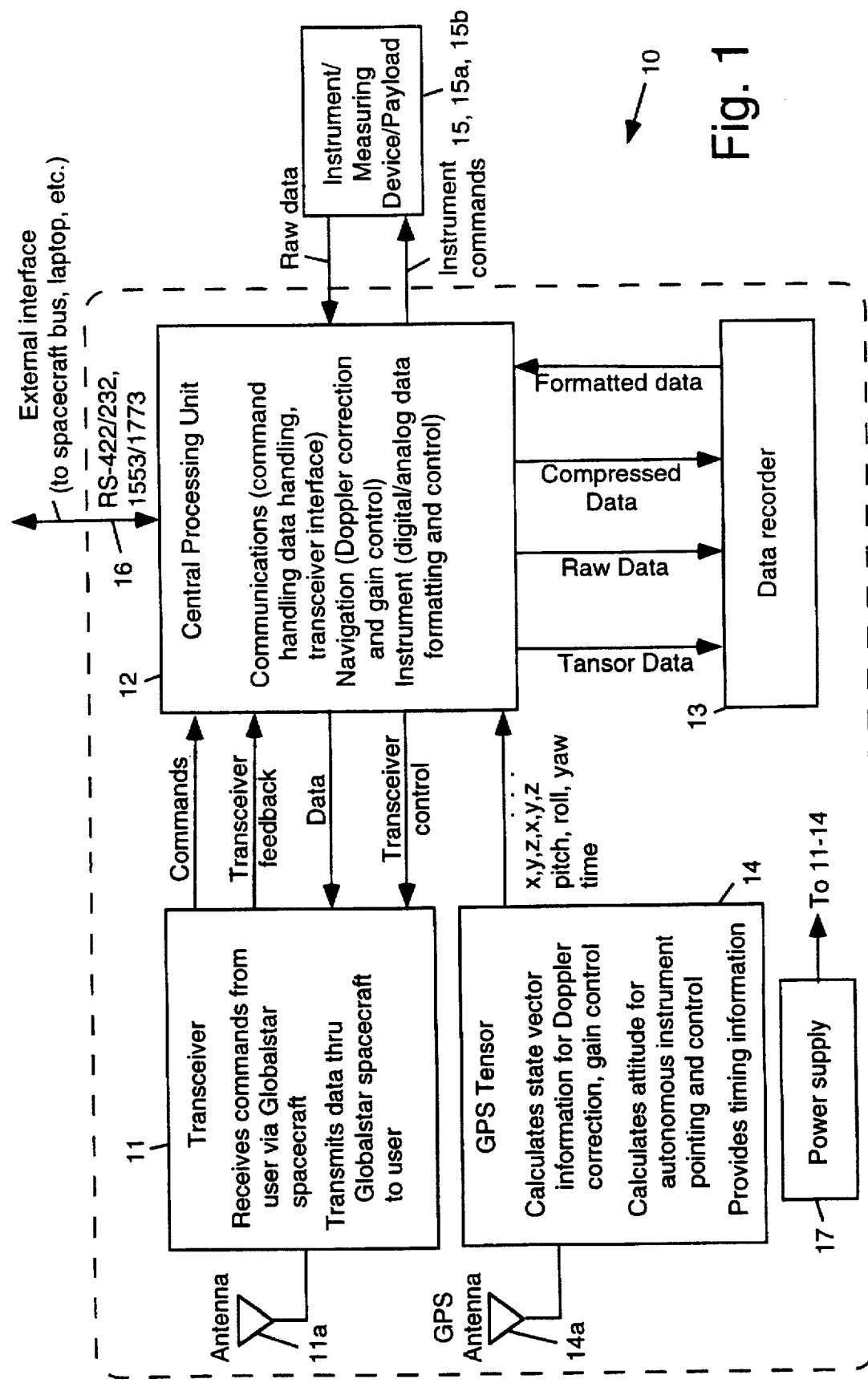

COMMUNICATION SYSTEM EMPLOYING SPACE-BASED AND TERRESTRIAL TELECOMMUNICATIONS EQUIPMENT

BACKGROUND

The present invention relates generally to communications systems, and more particularly, to a communications system that employs both space-based and terrestrial telecommunications equipment.

Advances in computer, navigation and wireless telecommunication technologies have produced better electronic devices at reduced costs. Individually, these devices have been applied to increase the performance of many common systems, such as desktop computers, surveying equipment, and modems, for example. However, it is the goal of the present invention to combine and integrate computer, navigation and wireless telecommunication technologies to produce a system that simultaneously lowers life cycle costs while increasing operational effectiveness, and which may be used for both terrestrial and orbital applications.

Great mechanical and scientific achievements have been made in planetary exploration, earth observation, and other domains of space travel, using custom equipment, and without a space communications and navigation infrastructure. These achievements have been very expensive due to the re-creation of this infrastructure for each mission. In times of fiscal pressures, public and private entities searched for methods to reduce operational costs.

Certain space-based navigation and communication systems have matured to the point where they are fully operational. The Global Positioning System (GPS) became fully operational in June, 1993, allowing, for the first time, complete coverage of the earth with an average of eight spacecraft. The GPS system allows any GPS receiver to gather precise time and position information anywhere on the planet.

The planned Big LEO (low earth orbiting) satellite networks include systems that will become fully operational by the turn of the century. At present, FCC-approved Big-LEO satellites include the Globalstar, Iridium, and Odyssey satellites, which are located in both low- and medium-earth orbits. These satellite systems will provide global connectivity with hand-held devices for two-way digital voice and data transfer.

Along with these space-based systems ground-based applications have advanced as well. For instance, Hertz offers rental cars with digitized city maps and GPS receivers on-board, providing drivers essential information needed to navigate streets of an unfamiliar city or region. Another example is a tour bus company, who can replace their tour guides with a CD-ROM activated video display system residing within the bus. As the bus travels around a city, software in the CD-ROM causes various multimedia "shows" to play based upon inputs from the GPS receiver.

The present invention is directed to integrating these technologies into a single system that provides for global telecommunications capability for data capture and/or robotic control in both terrestrial and orbital applications. The present invention has been termed a telestation, whose name is derived from the notions of telepresence and remote station. Telepresence is the ability to non-physically extend oneself to another location in real time. For years the science community has envisioned telepresence in planetary exploration, whereby scientists can operate instruments from the safety of an orbiting space station. With this capability, a robotic payload sent to a planetary surface may be made smaller and less complicated than a payload containing life support equipment. Further, scientific instruments need not operate autonomously since a human is "in the loop". As a result, data can be collected with simpler and less costly designs.

A number of applications on Earth exist that require information gathering in remote and/or inhospitable locations. The accuracy of the information becomes even more critical when policy is formulated based on the collected data. Also, the ability to remotely operate a payload increases the cost effectiveness of a system, because the system may be operated in multiple locations by a remotely-located individual.

Accordingly, it is an objective of the present invention to provide for a communications system that integrates computer, navigation and wireless telecommunication technologies to provide for a cost and operationally effective system that may be used for terrestrial and orbital applications.

SUMMARY OF THE INVENTION

To meet the above and other objectives, the present invention provides for a communications system employing a terrestrial telestation that includes an advanced microprocessor computer that provides command and data handling, a GPS receiver to provide position, time, and attitude information, and a transceiver, such as a Globalstar transceiver, to provide two-way wireless digital communications. An instrument, or payload, is coupled to the computer and is controlled thereby to relay data generated thereby to a user. Commands and data are uplinked and downlinked to the telestation by way of a satellite network, such as the Globalstar network. The telestation provides a user with real-time command and control of globally distributed instruments. This capability can be applied terrestrially for gathering information (e.g., science, environmental, etc.) in remote or inhospitable locations, or where logistical support is inadequate. An in-orbit version may be used for spacecraft or satellite payloads, allowing investigators instant access to the payloads during all phases of a mission.

The telestation provides for command of, control of, and communications with static and dynamic robotic instruments (including surface and airborne devices) located at any point around the Earth using satellites in low earth orbit. The telestation simplifies data gathering operations while simultaneously extending ones' presence. For example, seismometers can be attached to the telestation and placed near volcanoes. As a volcano erupts, the telestation can monitor events without endangering human life. Further, the telestation can provide a signal indicating when the volcano erupts, thus capturing the eruption in its earliest stages. Other examples include science gathering systems (meteorology, volcanology, oceanography), civil/governmental systems (pollution/ecosystem/wildlife monitoring, hazardous waste tracking, border monitoring for illegal aliens and/or drug interdiction), and commercial business systems (global tourism, truck fleet monitoring).

The telestation takes advantage of wireless communication technologies provided by a low earth orbiting satellite system, such as the Big LEO satellite system. This system provides for an order of magnitude reduction in operational costs. Comparable conventional systems use geosynchronous spacecraft that are costly to set up, and use VSAT terminals, for example, that do not provide the same level of coverage.

The present invention allows users to extend their presence to nearly any point on the globe in a real-time, in an interactive manner. The advantages provided by the present invention are that (a) travel is greatly reduced since users need not be physically collocated with their equipment, (b) the sampling and monitoring capability is greatly increased since one "person" can have a presence in multiple locales, (c) more samples or monitoring stations reduce risk while increasing the value of the end product (e.g., governmental policy, forewarning of natural dangers such as volcanic eruptions, etc.), and (d) data distribution augments existing data infrastructures, such as the National Information Infrastructure.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 1 shows a system block diagram of a terrestrial telestation in accordance with the principles of the present invention;

FIG. 2 illustrates a first embodiment of communications apparatus employing the terrestrial telestation of FIG. 1; and.

DETAILED DESCRIPTION

Figure 1A:
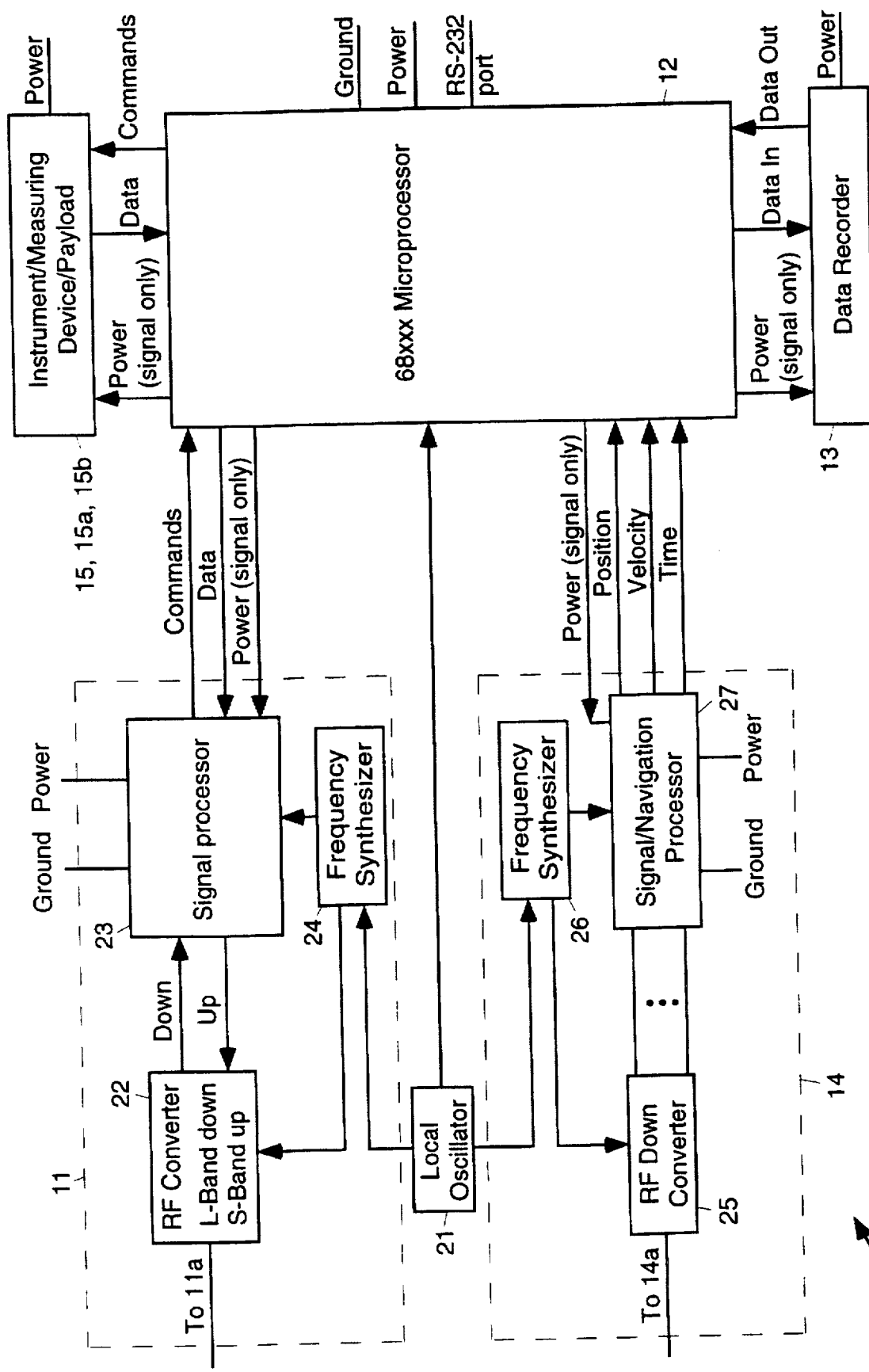
FIG. 1a shows a more detailed block diagram of the telestation of FIG. 1.

Referring to the drawing figures, FIG. 1 shows a system block diagram of communications telestation 10 in accordance with the principles of the present invention. The telestation 10 comprises three modules or subsystems, including a transceiver 11 coupled to an RF antenna 11a that provides for wireless communication of data and commands, a computer 12 (or central processing unit 12) that may be optionally coupled to a data recorder 13 that provides for command and data handling, and a GPS receiver 14 coupled to a GPS antenna 14a that generates position, attitude and time data derived from satellites of the Global Positioning System (not shown). Instruments 15, measuring devices 15a, or payloads 15b are coupled to the computer 12 which are controlled thereby. The telestation 10 has a data interface 16 that permits it to be coupled to an external computer or a bus of a spacecraft in which it is disposed. An AC or DC power supply 17 that may include solar panels 18 (FIG. 2) or a battery 18, for example, is provided to power the components of the telestation 10.

The computer 12 may be implemented using commercially available computer, for example, available from Intel, Motorola, or Texas Instruments, for example, and provides processing to implement command and control operations and data processing for the payload 15b, or for general communications purposes. The data processing provided by the computer 12 minimizes bandwidth requirements for transmitting data and commands by using compression software.

The data recorder 13 may be an optical or hard disk system or tape system, for example, that interfaces to the computer 12 in a conventional way. The data recorder 13 is controlled to store data from the transceiver 11, raw data from the instruments 15, and compressed data including GPS information that is used for subsequent analysis and post processing. The raw data from the instrumentation 15 is converted to formatted data that is transmitted by way of the transceiver to the user.

The GPS receiver 14 provides state vector and timing to the payload 15b and thus provides precise position location and time references. The GPS receiver 14 is used to accurately ascertain the location of the telestation 10 in order to post-process the raw data derived from the payload 15b. The GPS receiver 14 calculates state vector information to provide for Doppler correction and gain control in orbital applications only. The GPS receiver 14 also calculates the attitude of the telestation 10 to provide for autonomous instrument pointing and control when this is required for the instrumentation 15.

Referring to FIG. 1a, it shows a more detailed block diagram of the telestation 10 of FIG. 1 illustrating details of the transceiver 11 and the GPS receiver 14. The transceiver 11 comprises an RF converter 22 that is coupled between the RF antenna 11a and a signal processor 23. A local oscillator 21 is coupled to a first frequency synthesizer 24 that has outputs that are coupled to the RF converter 22 and the signal processor 23. The local oscillator 21 is also coupled to computer 12. The signal processor 23 outputs commands uplinked by the user to the computer 12 and receives a power on signal from the computer 12, and data from the instrument 15 that is processed by the computer 12 that is downlinked to the user.

The GPS receiver 14 comprises an RF downconverter 25 that is coupled between the GPS antenna 14a and a signal/navigation processor 27. The local oscillator 21 is coupled to a second frequency synthesizer 26 that has outputs that are coupled to the RF downconverter 25 and the signal/navigation processor 27. The signal/navigation processor 27 receives a power on signal from the computer 12 and outputs position velocity and time data to the computer 12.

Figure 2:
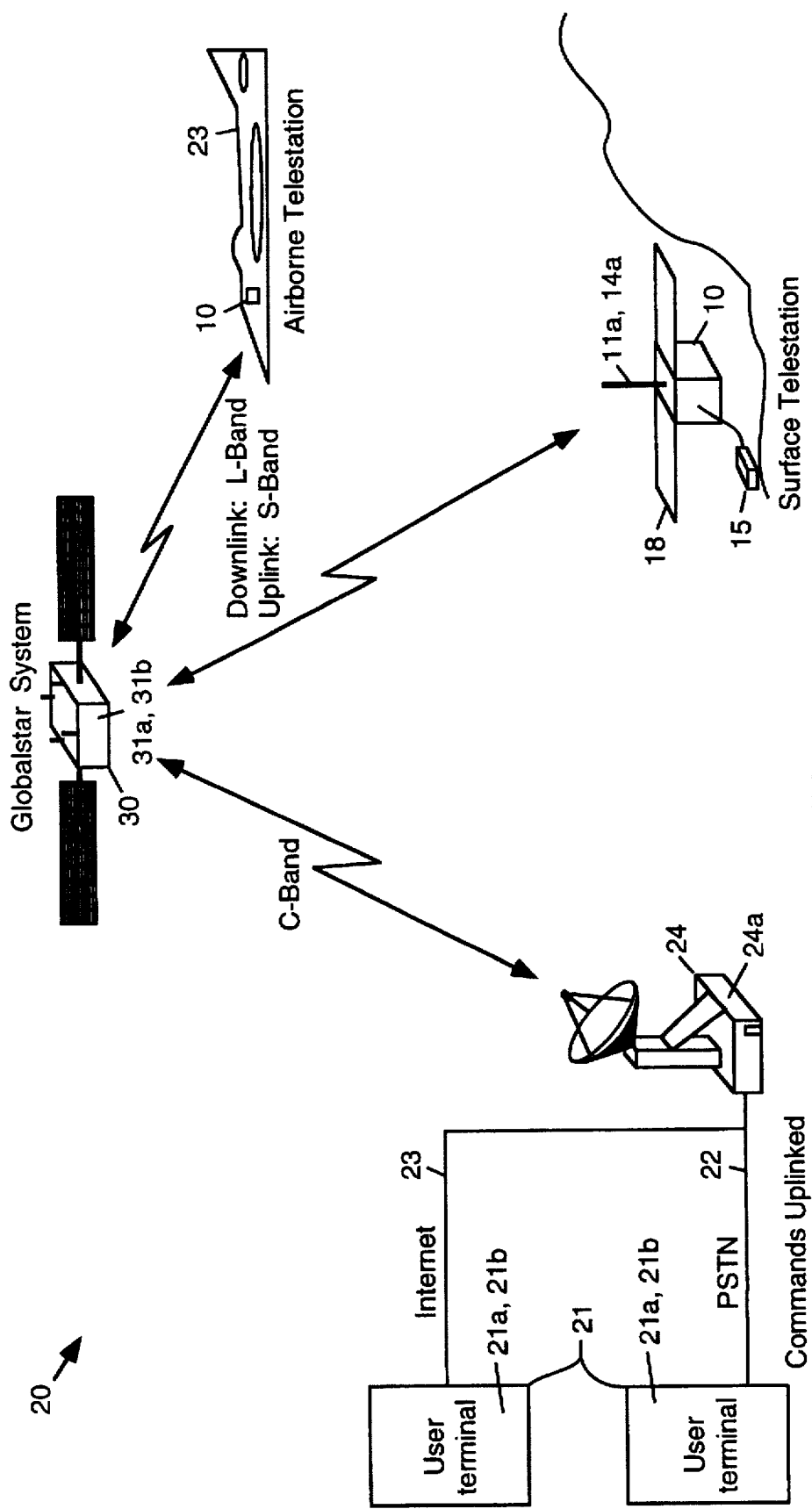

Referring to FIG. 2, it illustrates a first embodiment of communications apparatus 20 employing a variety of telestations 10 shown in FIG. 1. The communications apparatus 20 is used for communication between a user or users and terrestrial and airborne based telestations 10. Each user employs a user terminal 21 to communicate with the terrestrial or airborne based telestations 10 by way of a communication link, such as a public service telephone network (PSTN) 22 or an Internet link 23 that are coupled to a gateway 24. The user terminals 21 comprise dual mode handsets 21 that have cellular and Globalstar transceivers 21a, 21b therein. The dual mode handsets 21 are digitally controlled, and require very little power.

The gateway 24 provides a communications link to a low earth orbiting satellite system 30, such as the Globalstar satellite system 30 or network 30 developed by the assignee of the present invention. The satellite system 30 provides a wireless communication link between the user terminal 21 via the gateway 24, and the terrestrial or airborne based telestations 10. The satellite system 30 includes both cellular and data transceivers 31a, 31b. The satellite system 30 relays commands and data to and from the user terminal 21 to the terrestrial or airborne based telestations 10.

For example, a user, using the user terminal 21, "calls" the terrestrial based telestation 10 to communicate with the payload 15b coupled thereto. The wireless communication link provided by the Globalstar satellite system 30, allows the terrestrial based telestation 10 to be placed at nearly any point around the Earth without encountering communication interference with existing systems.

More specifically, three technologies are integrated in the telestation 10 which include navigation, communication, and computer technologies. GPS receivers 14 are widely used in commercial industries, and commercially available handheld GPS receivers provide precise position location and time references. However, the present invention used for orbital applications employs a GPS receiver 14 developed by the assignee of the present invention, known as a Tansor, that generates attitude data in addition to position and time reference data. For terrestrial applications, other commercially available GPS receivers 14 may be adapted for use in the present invention, such a GPS receiver manufactured by Trimble, Ashtech, or Rockwell-Collins, for example, which is embodied in a computer chip, and which may be modified to provide all functions provided by the Tansor GPS receiver 14.

Wireless communications provided by the telestation 10 are implemented using the low earth orbit satellite transceiver network 30, which may be provided by a 48 satellite constellation Globalstar telecommunications satellite system 30 developed by the assignee of the present invention, and dual mode (cellular and Globalstar) handsets 21 (user terminals 21) operated by users. The Globalstar system 30 provides a real-time communications link covering about 90% of the surface of the Earth using the wireless transceivers 31a, 31b. Both the cellular transceivers 31a and Globalstar data transceivers 31b are compatible with the Globalstar satellite transceiver system 30. The Globalstar system 30 enables users to call nearly anywhere in the world at any time using cellular transceivers located on spacecraft of the system 30. The Globalstar system 30 employs Code Division Multiple Access (CDMA) technology that uses a limited bandwidth while increasing the quality of transmitted information.

The Globalstar transceivers 31a, 31b on the spacecraft are used to interconnect the user terminal 21 to the payload 15b or instrument 15 coupled to the telestation 10 in a manner analogous to a modem operating at 2.4 kbps. This modest data rate is more than adequate for many instruments 15b existing today, and a compression algorithm implemented in the computer 12, such as Fractals, for example, may be used to ease bandwidth requirements. For terrestrial applications, the GPS receiver 14 provides position and time data. Orbital applications require information from the GPS receiver 14 to determine Doppler correction factors, and to adjust the signal strength for operation using the Globalstar system 30.

The computer 12 provides command and data handling functions that are required to operate the instruments 15 and process the data for subsequent transmission to the user terminal 21. The computer 12 may be implemented using a RISC 6000 microprocessor, to provide 32-bit addressing and a 27 MIPS processing rate using less than 15 Watts of power. The optional data recorder 16 may be used to ensure that information generated by the instrument 15 is not lost.

In operation, once a telestation 10 is in place, its operation depends entirely upon user requirements. Two scenarios are described below, one driven by events, and one that provides for continuous operation. In both scenarios, the telestation 10 is free to move.

The event driven scenario is as follows, and this situation is illustrated in FIG. 2. The telestation 10 is commanded to passively wait for an event to occur, and monitors the environment at a low level and low frequency. When an event occurs, the computer 12 activates the telestation 10, logs the time and position at which the event occurred, which is derived from the GPS receiver 14, and begins collecting data. The computer 12 also initiates a phone call notifying the user that an event has occurred. Examples include unpredictable events such as tectonic movement, volcanic eruptions, encounters with wildlife, or a dynamic change in a given parameter beyond a predetermined threshold.

The continuous operation scenario is as follows. In this scenario, the user terminal 21 is employed to continuously monitor and download data from the telestation 10. The user initiates communications using a coded command set, for example, which either turns on and off the instrument 15, adjusts control parameters of the instrument 15 (such as gain, signal to noise ratio, frequency, etc.), and requests data to be sent in a bit-stream to the user terminal 21.

In both scenarios, the telestation 10 communicates with transceivers 31a, 31b in a Globalstar satellite system 30 in either S- or L-band (forward- and return-link, respectively). The Globalstar transceiver 31b routes the data to the gateway 21, which uses the public switched telephone network (PSTN) 22 to further route the data to the user terminal 21. The exact routing is transparent to the user. The operational scenario for the terrestrial application is illustrated in FIG. 2, which may employ telestations 10 on the ground, in the water, or in the aircraft 23.

Typical terrestrial applications of the telestation 10 are described below. These applications include science and education, civil and governmental, and entertainment applications. The telestation 10 is useful for a variety of science disciplines, as well as fostering education in a multitude of categories.

For example, currently, limited capability exists for transmitting seismic data to a central processing site. Typically data transfer is accomplished via strip charts mailed to the US Geological Survey station in Colorado Springs, which is time consuming and not very useful for predicting or mitigating seismic events. Ideally, seismometer instruments 15 are positioned to triangulate and derive the source and magnitude of tectonic activity. These long-lived, passive instruments 15 remain dormant over great periods of time, and become active once an event occurs. The placement of these instruments 15 is primarily driven by the tectonic features of the planet, and are typically positioned near faults. Accessibility secondarily drives the placement of these instruments 15, since they require moderate maintenance for data retrieval and power regeneration or replacement.

The use of the telestation 10 greatly simplifies the operational requirements while providing a potential for increased science return and prediction capability. The telestation 10 may be configured such that, when an event occurs, it calls a scientist and transmits data regarding the magnitude, duration, and frequency of tectonic activity. Further, the scientist may adjust the parameters of the instrument 15 in real-time, to capture secondary transients to increase the value of the data. Solar cells 18 on the telestation 10 provide power for long life, negating the need for maintenance of the power supply 17. The computer 12 compresses the data by a factor of 10, for example, to minimize bandwidth requirements, while the data recorder stores the raw data. There are no restrictions on the number of seismic telestations that may be employed, thereby allowing finer resolution. Two seismic telestations 10 may be collocated to sample different wavelengths without interference.

Meteorological science requires a network of stations longitudinally spaced to provide ground truth for remote sensing satellites. Currently, physical constraints limit the number of meteorology stations. Most cities use meteorological instruments 15, but a widely distributed set of instruments 15 enables a finer resolution to ascertain the micro climates and transient events associated with the Earth's weather. The wide distribution of meteorological telestations 10 may be shared among many entities (e.g., governments, news groups, etc.), to provide data to anyone who has access. Meteorological telestations 10 contain instruments 15 that determine temperature, humidity, wind speed and direction, and barometric pressure. The computer 12 is used to post-process the data to minimize bandwidth requirements or to provide the data in a user-friendly format, such as automatically graphing the data, for example. This processing is further enhanced by the o data recorder 13, which may be used to send previously recorded data to ascertain weather patterns, for example. Because the oceans have a significant impact on our weather, the meteorological telestations 10 can be placed on buoys to deliver the same type of data. Currently, buoys are placed close to land masses, and are serviced once a year. Meteorological telestations 10 provide a means for transmitting the data to a ground station to provide continuous monitoring.

An imaging instrument 15 may be coupled to the telestation 10 and placed at areas known to have volcanic activity, that is activated when a volcano erupts. Also, a telestation 10 may be air dropped in the vicinity of a volcano once an eruption has occurred. The data that the telestation 10 provides is useful in understanding the processes involved with an eruption, while allowing the observer to be a safe distance from the event. The volcano will typically destroy the telestation 10, but measurements can be taken until the last possible moment without the threat to human life.

Instrumented telestations 10 may be dropped using a buoy in the vicinity of carcinogenic oil spills to determine the hazardous fallout. The buoy and oil will travel with the currents, leading researchers and policy makers to take evasive action ensuring minimal environmental damage.

As awareness of the environment increases, the status of streams and lakes have become important. The level of fresh (or frozen) water provides an indication of an area's ecological wellness. Furthermore, the struggle continues between farmers who need fresh water and environmentalists who are concerned about the projected level of fresh water. Currently in situ measurements are physically taken, logged, and relayed to central data bases. By using the GPS receiver and equipping the telestation 10 with appropriate instruments 15, these in situ measurements can be taken remotely and with greater frequency. Furthermore many mountainous summits are inaccessible during the winter, and an air dropped telestation 10 may be used to relay more accurate information than is provided by visual inspection or extrapolation.

Currently, tagged wildlife are manually tracked and their movement is logged. This tedious process may be simplified using the telestation 10. A microminiaturized beacon device may be attached to the tag, which would set off an alarm on a telestation 10. When an animal is within close proximity to the telestation 10, the beacon on the animal triggers the telestation 10, which then notes the tag's identifier and time. This data is then automatically logged and transmitted via the Globalstar system 30 to scientists who then can determine the animal traffic and other physiological features.

In a manner similar to the pollution monitoring telestation, telestations may be deployed to detect wildfires in bush country, for example. Many fires occur in these remote areas, and often go undetected for some time, allowing the fire to grow.

Attaching the telestation to an iceberg allows scientists and ocean-going vessels to monitor the paths of icebergs. The path of an iceberg is important to the military as well, since they pose a danger to submarines.

The telestation 10 may be used for military communications. During war games, for example, the telestation can be attached to various vehicles, and can relay battlefield information back to the commander. A UHF-based system, built by the assignee of the present invention, known as TAPER, may be coupled to the telestation 10 to provide battlefield information with limited coverage.

Remotely piloted vehicles (RPV's) have limited in range because they must remain within the line-of-sight of a tower-based pilot. Using a telestation 10 to communicate between a GPS Tensor receiver 14 and the Globalstar system 30, RPV's can be flown nearly anywhere in the world with the pilot located at a fixed location. The receiver 14 also eliminates beacon interferometry currently used by RPV's.

A telestation 10 having infrared motion detectors as instruments 15 can be located near borders to notify law enforcement officials when motion is detected, such as when a small plane flies overhead. Multiple small, inconspicuous telestations 10 may be deployed to monitor the border. An imager instrument 15 may be coupled to the telestation 10 and commanded to turn on when motion is detected. The imagery can then be used to capture suspects.

Figure 3:
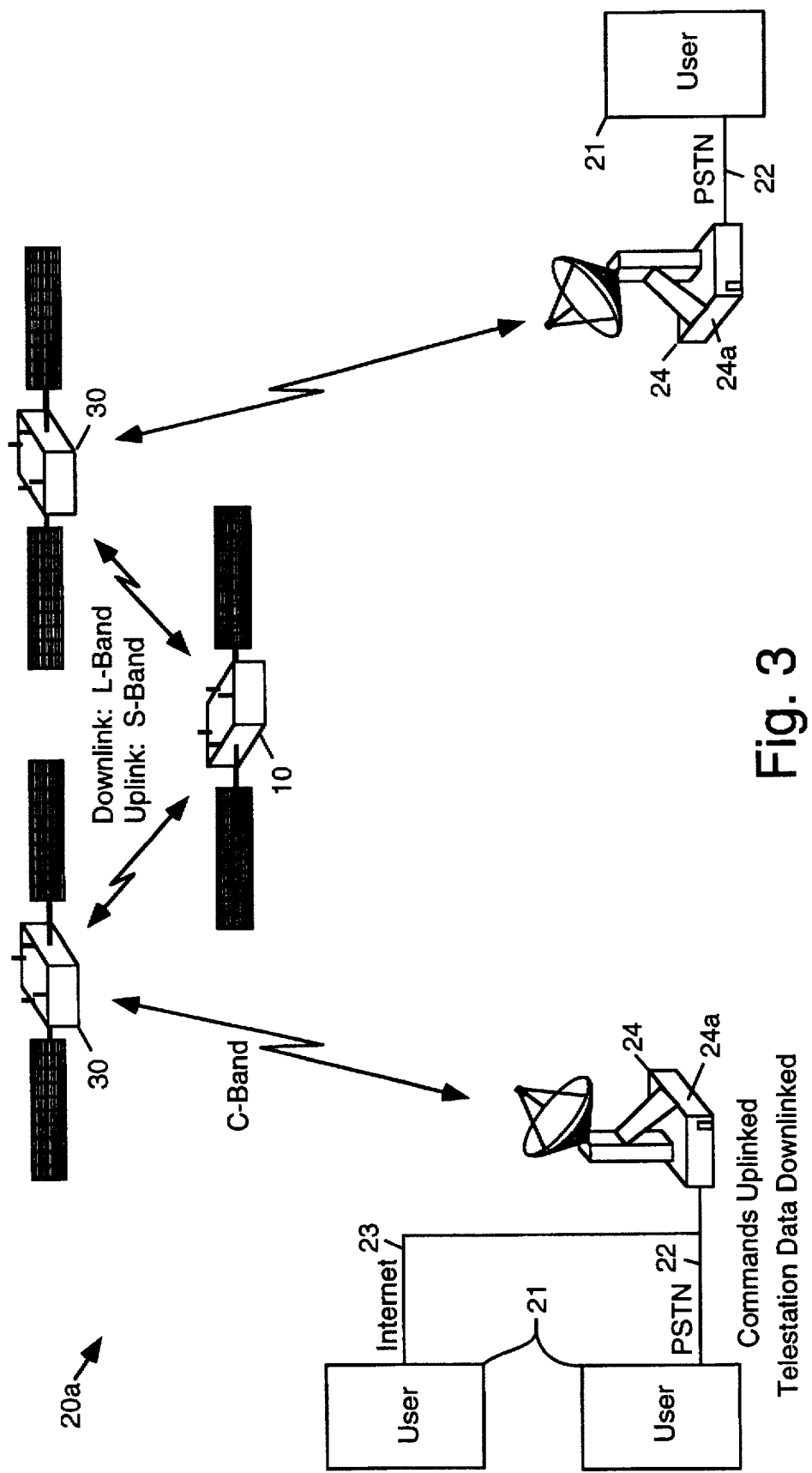
FIG. 3 illustrates a second embodiment of communications apparatus employing an orbital telestation.

Referring now to FIG. 3, it illustrates a second embodiment of communications apparatus 20a employing an orbital telestation 10. The orbital telestation 10 operates in a manner similar to the terrestrial telestation 10, but is disposed on a spacecraft 35. The payload 15b or instrument 15 on the spacecraft 35 functions like a node on a computer network. Instrument commands are uplinked via the Globalstar system 30 and the orbital telestation 10 to the instrument 15. Data collected by the instrument 15 is returned to the user via the Globalstar system 30, gateway 24 and PSTN 22 or Internet 23, which eliminates the need for a dedicated communications link and supporting ground infrastructure for many payloads 15b. Continuous payload monitoring may be eliminated, because the payload 15b has the ability to call the user when an event occurs using its transceiver 11.

Currently, in the US, either the Air Force Tracking Network or NASA's TDRS system is used to satisfy these requirements. Both systems are expensive to use, and both have priority missions to support, which implies an inability to transfer data and/or commands upon demand for every user. Not only does the orbital telestation 10 allow a user to more readily capture data relating to episodic events, but it can offset operational expenses by reducing ground support requirements, in essence, replacing the spacecraft operator with the user.

The 2.4 kbps data rate of the Globalstar system 30 is more than adequate for commanding an instrument 15, which typically contains only a dozen instructions totaling 1–2 kilobits. This data rate does not necessarily meet all return data rate requirements in all cases, but is adequate to provide a preview of the data from the instruments 15 (metadata files), which is sometimes essential to successful operation. In this case, the user would continue to use an existing infrastructure to downlink data from the instrument 15.

Thus, an improved system that integrates computer, navigation and wireless telecommunication technologies to provide for a cost and operationally effective system that may be used for terrestrial and orbital applications has been disclosed. It is to be understood that the described embodiments are merely illustrative of some of the many specific embodiments which represent applications of the principles of the present invention. Clearly, numerous and varied other arrangements may be readily devised by those skilled in the art without departing from the scope of the invention.

What is claimed is:

1. Communication apparatus comprising:
    a telestation comprising:
        a transceiver;
        a computer coupled to transceiver, which computer provides for command and data handling;
        a GPS receiver coupled to the computer, which receiver provides position, attitude and time data to the computer; and
        a power supply coupled to the transceiver, the computer, and the GPS receiver to provide power thereto;
    data-gathering apparatus coupled to the computer, which apparatus provides a means for gathering data indicative of predetermined events;
    a user terminal comprising voice and data transceivers, which user terminal generates instrument commands;
    a communication gateway having a gateway transceiver;
    a communication link coupled between the user terminal and the communication gateway; and
    a satellite-based communications system having a plurality of satellite transceivers for communicating between the transceiver in the user terminal and the transceiver in the telestation;
    and wherein instrument commands generated at the user terminal are communicated via the communication link to the communication gateway, which uplinks the commands to the satellite-based communications system, which relays the uplinked commands to the transceiver in the telestation, and wherein the computer interprets the commands to configure and control the data-gathering apparatus;
    and wherein data gathered by the data-gathering apparatus is processed by the computer and is transmitted by the transceiver in the telestation by way of the satellite-based communications system to the gateway, which transmits the data to the user terminal by way of the communication link.

2. The communication apparatus of claim 1 wherein the computer is coupled to a data recorder that provides for command and data handling.

3. The communication apparatus of claim 1 wherein the power supply comprises a solar panel.

4. The communication apparatus of claim 1 wherein the power supply comprises a battery.

5. The communication apparatus of claim 1 further comprising:
    a data interface coupled to the computer for interfacing to devices that are external to the communication apparatus.

6. The communication apparatus of claim 1 wherein the communication gateway comprises a public service telephone network.

7. The communication apparatus of claim 1 wherein the communication gateway comprises an Internet link.

8. The communication apparatus of claim 1 wherein the satellite-based communications system comprises a Globalstar satellite-based communications system.

9. The communication apparatus of claim 1 further comprising:
    a local oscillator;
    and wherein the transceiver in the telestation comprises:
        an RF antenna;
        an RF converter coupled to the RF antenna;
        a signal processor coupled between the RF converter and the computer which signal processor outputs commands uplinked by the user to the computer and outputs data by way of the computer that is downlinked to the user;
        a first frequency synthesizer having an input coupled to the local oscillator and having outputs coupled to the RF converter and signal processor;
    and wherein the GPS receiver comprises:
        a GPS antenna;
        an RF downconverter coupled to the GPS antenna;
        a signal/navigation processor coupled between the RF downconverter and the computer which signal/navigation processor outputs position velocity and time data to the computer;
        a second frequency synthesizer having an input coupled to the local oscillator and having outputs coupled to the RF downconverter and the signal/navigation processor.

10. Communication apparatus comprising:
    a telestation comprising:
        a transceiver;
        a computer coupled to transceiver, which computer provides for command and data handling;
        a GPS receiver coupled to the computer, which receiver provides position, attitude and time data to the computer; and
        a power supply coupled to the transceiver, the computer, and the GPS receiver to provide power thereto;
    a user terminal comprising voice and data transceivers, which user terminal generates instrument commands;
    a communication gateway having a gateway transceiver;
    a communication link coupled between the user terminal and the communication gateway; and
    a satellite-based communications system having a plurality of satellite transceivers for communicating between the transceiver in the user terminal and the transceiver in the telestation;
    and wherein commands generated at the user terminal are communicated via the communication link to the communication gateway, which uplinks the commands to the satellite-based communications system, which relays the uplinked commands to the transceiver in the telestation, and wherein the computer interprets the commands to configure and control the telestation.

11. The communication apparatus of claim 10 wherein the computer is coupled to a payload, and wherein the computer couples commands to the payload.

12. The communication apparatus of claim 10 wherein the power supply comprises a solar panel.

13. The communication apparatus of claim 10 wherein the power supply comprises a battery.

14. The communication apparatus of claim 10 further comprising:
    a data interface coupled to the computer for interfacing to devices that are external to the communication apparatus.

15. The communication apparatus of claim 10 wherein the communication gateway comprises a public service telephone network.

16. The communication apparatus of claim 10 wherein the communication gateway comprises an Internet link.

17. The communication apparatus of claim 10 wherein the satellite-based communications system comprises a Globalstar satellite-based communications system.

18. The communication apparatus of claim 10 further comprising:

a local oscillator;

and wherein the transceiver in the telestation comprises:
- an RF antenna;
- an RF converter coupled to the RF antenna;
- a signal processor coupled between the RF converter and the computer, which signal processor outputs commands uplinked by the user to the computer and outputs data by way of the computer that is downlinked to the user;
- a first frequency synthesizer having an input coupled to the local oscillator and having outputs coupled to the RF converter and signal processor;

and wherein the GPS receiver comprises:
- a GPS antenna;
- an RF downconverter coupled to the GPS antenna;
- a signal/navigation processor coupled between the RF downconverter and the computer which signal/navigation processor outputs position velocity and time data to the computer;
- a second frequency synthesizer having an input coupled to the local oscillator and having outputs coupled to the RF downconverter and the signal/navigation processor.

* * * * *